United States Patent [19]
Petersen

[11] 3,898,331
[45] Aug. 5, 1975

[54] 4'-DEHYDRO-OLEANDRIN AND PHARMACEUTICAL COMPOSITION THEREOF

[75] Inventor: Rudolf Petersen, Wohltorf, Germany

[73] Assignee: Beiersdorf Aktiengesellschaft, Hamburg, Germany

[22] Filed: Apr. 25, 1974

[21] Appl. No.: 464,131

[30] Foreign Application Priority Data
May 15, 1973 Germany............................ 2324993

[52] U.S. Cl.............................. 424/182; 260/210.5
[51] Int. Cl.[2]...................................... A61K 31/705
[58] Field of Search.................. 424/182; 260/210.5

[56] References Cited
OTHER PUBLICATIONS
Chem. Abstracts, volume 78, 1973, paragraph (164077s), Oleandrin from Nerium odorum.

*Primary Examiner*—Johnnie R. Brown
*Assistant Examiner*—Cary B. Owens
*Attorney, Agent, or Firm*—Bierman & Bierman

[57] ABSTRACT

A new compound is disclosed which is named 4'-dehydro-oleandrin. It has the structure

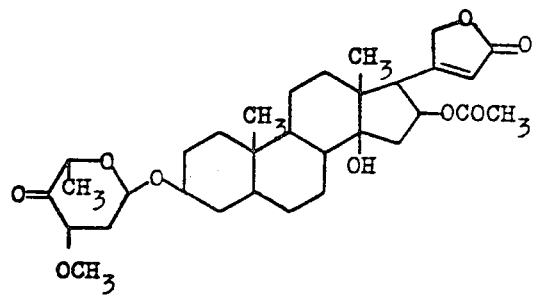

and is useful as a cardiotonic.

2 Claims, No Drawings

4'-DEHYDRO-OLEANDRIN AND PHARMACEUTICAL COMPOSITION THEREOF

This application claims the priority of German Patent application No. 2324993 filed May 15, 1973.

The present invention relates to 4'-dehydro-oleandrin which has the structure

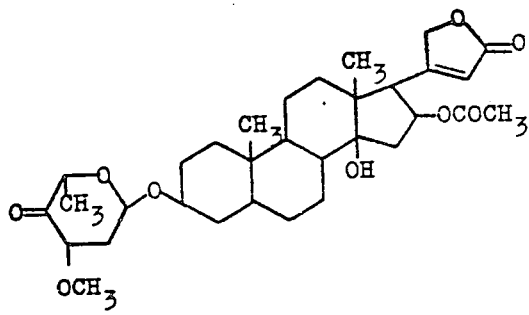

I and which can be produced by oxidation of oleandrin, the principal glycoside of *nerium oleander* L.

The new compound according to the invention is a good cardiotonic, and particularly suitable for use as a medicament in the treatment of cardiac insufficiency.

By converting the hydroxyl group in the sugar radical of oleandrin into a keto group, the lipoid-solubility, and thus the oral absorption of the substance, is considerably increased, as can be seen from the following test data.

|  | Hatcher dose (LD-100 i.v. mg/kg cat) | oral toxicity (LD-50 oral, mg/kg cat) | value factor (oral toxicity/ Hatcher dose) |
|---|---|---|---|
| oleandrin | 0.28 | 0.35 | 1.25 |
| 4'-dehydro oleandrin | 0.56 | 0.60 | 1.07 |

The so-called "value factor" is a measure of the oral absorption; the lower its value, the better is the oral effectiveness of a substance.

The instant compound has been found additionally useful as an intermediate for preparing synthetic glucosides, owing to the reactivity of its keto- group at the 4'-position.

The oxidation of oleandrin to 4'-dehydro-oleandrin can be effected with oxidizing agents known in the sugar industry. Particularly suitable for this purpose are dimethyl sulfoxide and chromium (VI)-oxide.

The oxidation with chromium (VI)-oxide is carried out preferably in pyridine, adding dichloromethane, in order to avoid possible spontaneous ignition of the reaction mixture. The reaction is conducted at a temperature in the range of 0° to 100°C, the reaction mixture being preferably left first for 1–3 hours at room temperature and then boiled for 1.5 to 2 hours under reflux conditions (bath temperature 80°–90°C). By pouring the reaction mixture into ice, the inorganic material is separated and, after being taken up in dichloromethane followed by evaporation of the solvent, the reaction product is purified by column chromatography from silica gel and recrystallized, if necessary, from methanol.

The oxidation with dimethyl sulfoxide can be effected in pure acetic anhydride or, preferably, in benzene with the addition of pyridine, trifluoroacetic acid and dicyclohexylcarbodiimide. The reaction will proceed at room temperature.

The preparation of the new compound according to the present invention is described more fully in the following Examples:

EXAMPLE 1

To a mixture of 150 ml dichloromethane and 9.5 ml pyridine are added under vigorous stirring 6.7 g (high-purity) chromium (VI)-oxide (0.067 mole), and stirred for another 15–20 minutes at room temperature.

5.77 g oleandrin are dissolved in 20 ml dichloromethane and 8 ml pyridine and this solution is added with stirring to the above oxidation mixture. The reaction mixture is stirred for 2 hours at room temperature and subsequently refluxed for 5 hours at a bath temperature of 80°–90°C. After cooling, the mixture is added to ice and the dichloromethane phase is separated. The aqueous phase is extracted twice, using 100 ml dichloromethane each time. The combined organic phases are washed three times with 150 ml ice water. After drying over sodium sulfate, the solvent is evaporated at 50°C under vacuum. The residue is similarly evaporated three times with 30 ml methanol to eliminate the pyridine. This residue is purified by column chromatography. It is eluted from a column of silica gel S (Riedel-deHaen AG) with chloroform. After evaporation of the chloroform fractions, the residues are mixed with methanol. The precipitated white crystal sludge is dissolved and allowed to crystallize from methanol, if necessary. 3.9 g (68 percent yield) 4'-dehydro-oleandrin with a melting point of 206°–208°C are obtained.

Thin-layer chromatography on DC-cards SIF (Riedel-deHaen AG) with chloroform which contains 4% methanol provided $R_f$ values of 0.52 for 4'-dehydro-oleandrin and 0.39 for oleandrin.

EXAMPLE 2

288 mg oleandrin were dissolved in a flask containing a mixture of 0.75 ml benzene and 0.75 ml dimethyl sulfoxide. To this mixture 0.075 ml pyridine, 0.0275 ml trifluoracetic acid and 0.625 g dicyclohexylcarbodiimide are added successively, under ice cooling. A precipitate is obtained and the reaction mixture turns yellow. After stirring for 6 hours at room temperature, the contents of the flask are added to ice, taken up in dichloromethane, and purified over a column, as in Example 1. Yield: 80 mg (28%) 4'-dehydro-oleandrin, melting point 206°–208°C.

EXAMPLE 3

A mixture of 577 mg oleandrin, 0.6 ml acetic anhydride and 2 ml dimethylsulfoxide is stirred for 30 hours under a nitrogen atmosphere at a temperature of 35°–40°C. The solution is subsequently poured into a mixture of 10 ml water and 15 ml chloroform. The organic phase is separated, and washed twice with 5 cc water. After drying over magnesium sulfate, the solvent is evaporated and the substance is purified as in Example 1. A yield of 150 mg was obtained (26%) having a melting point of 206°-208°C.

It will be appreciated that the compound of the present invention has been found to be very useful as a cardiotonic and therefore suitable as a medicament for treating cardiac insufficiency. Hence, the present invention also comprises a pharmaceutical composition. Accordingly, 4'-dehydro oleandrin can be combined in any desirable proportion with any of many known pharmaceutical carriers. The selection of carrier is fully within the expertise of one having reasonable skill in the art, the only criteria being that it be compatible with 4'-dehydro oleandrin and that it be pharmaceutically acceptable with respect to the host and malady being treated.

What is claimed is:

1. 4'-Dehydro-oleandrin having the structure

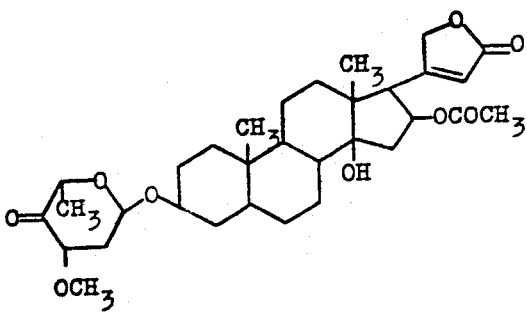

2. A pharmaceutical composition comprising a pharmaceutically effective amount of 4'-dehydro-oleandrin and a pharmaceutically acceptable carrier.

* * * * *